(12) United States Patent
Liao

(10) Patent No.: US 7,001,514 B1
(45) Date of Patent: Feb. 21, 2006

(54) SEPTIC TANK

(76) Inventor: Chin-Tuan Liao, No. 92, Hwa-Yan St., Chaur-Jau Jenn, PingTung Hsien (TW)

( * ) Notice: Subject to any disclaimer, the term of this patent is extended or adjusted under 35 U.S.C. 154(b) by 0 days.

(21) Appl. No.: 10/931,743

(22) Filed: Sep. 1, 2004

(51) Int. Cl.
*B01D 21/02* (2006.01)
*C02F 3/00* (2006.01)

(52) U.S. Cl. .................. 210/219; 210/220; 210/299; 210/528; 210/532.2

(58) Field of Classification Search .............. 210/219, 210/220, 299, 461, 528, 532.1, 532.2, 538
See application file for complete search history.

(56) References Cited

U.S. PATENT DOCUMENTS

| | | | | |
|---|---|---|---|---|
| 872,412 | A | * | 12/1907 | Greth ................... 210/532.1 |
| 1,120,351 | A | * | 12/1914 | Weston ................. 210/532.2 |
| 1,851,172 | A | * | 3/1932 | Gordon ................... 210/538 |
| 1,902,171 | A | * | 3/1933 | Kopp ..................... 210/538 |
| 2,416,867 | A | * | 3/1947 | Coberly ................ 210/532.2 |
| 2,552,452 | A | * | 5/1951 | Phillips ................. 210/528 |
| 2,987,186 | A | * | 6/1961 | Burgoon et al. ........... 210/220 |
| 3,741,393 | A | * | 6/1973 | Estes et al. ............ 210/532.2 |
| 3,826,376 | A | * | 7/1974 | Carlson et al. ......... 210/532.2 |
| 3,986,963 | A | | 10/1976 | Maroschak |
| 4,104,166 | A | | 8/1978 | LaRaus |
| 4,179,375 | A | | 12/1979 | Smith |
| 4,250,040 | A | | 2/1981 | LaRaus |
| 4,334,991 | A | | 6/1982 | Beede |
| RE32,312 | E | * | 12/1986 | Crates et al. ........... 210/532.2 |
| 4,715,966 | A | | 12/1987 | Bowman |
| 4,832,846 | A | | 5/1989 | Gavin |
| 4,886,605 | A | | 12/1989 | Hervé |
| 4,997,562 | A | | 3/1991 | Warner |
| 5,382,357 | A | | 1/1995 | Nurse |
| 5,441,632 | A | | 8/1995 | Charon |
| 5,482,621 | A | | 1/1996 | Nurse |
| 5,569,387 | A | * | 10/1996 | Bowne et al. ........... 210/532.2 |
| 5,618,445 | A | | 4/1997 | Gavin |
| 5,762,790 | A | | 6/1998 | Zoeller |
| 5,997,735 | A | | 12/1999 | Gorton |
| 6,012,871 | A | | 1/2000 | Bryant |
| 6,015,488 | A | | 1/2000 | Gavin |
| 6,136,190 | A | | 10/2000 | Zoeller et al. |
| 6,234,200 | B1 | * | 5/2001 | Hall ..................... 210/532.2 |
| 6,261,452 | B1 | * | 7/2001 | Mayer ..................... 210/299 |
| 6,267,882 | B1 | | 7/2001 | Houck et al. |
| 6,274,033 | B1 | | 8/2001 | Hudgin |
| 6,280,614 | B1 | | 8/2001 | Berg et al. |
| 6,331,247 | B1 | | 12/2001 | Zoeller et al. |
| 6,447,680 | B1 | | 9/2002 | Richard |
| 6,495,040 | B1 | | 12/2002 | Zoeller et al. |

* cited by examiner

*Primary Examiner*—Christopher Upton
(74) *Attorney, Agent, or Firm*—Alan D. Kamrath; Nikolai & Mersereau, P.A.

(57) ABSTRACT

A septic tank includes a chamber, an inlet through which waste water enters the chamber, an outlet located below the inlet, and an outlet pipe including an outlet section extending through the outlet. The outlet pipe further includes an inclined section in the chamber and extending downward from the outlet pipe. The inclined section includes a closed lower end. The inclined section further includes a suction portion located below the outlet. The suction portion includes a plurality of through-holes in a circumference thereof for sucking dischargeable purified waste water in the chamber into the inclined section and then discharged via the outlet section.

17 Claims, 9 Drawing Sheets

SEPTIC TANK

BACKGROUND OF THE INVENTION

1. Field of the Invention

The present invention relates to a septic tank. In particular, the present invention relates to a septic tank for treating household waste water including human feces in daily life.

2. Description of the Related Art

Household waste water containing human feces is firstly collected in a septic tank in a basement of a building. Cleaner waste water after purification is discharged to adjacent water discharge pipes to avoid contamination to drinking water and the environment. The decayed and deposited sludge in the septic tank is removed when it is accumulated to a certain amount.

For efficient purification of the waste water to be discharged, the septic tank is divided into several chambers including a decomposing chamber, a filtering chamber, and a deposit chamber that are separated from one another by partitioning walls. A waste water inlet pipe is mounted at a higher level of the first chamber, and a waste water outlet pipe is mounted at a lower level of the last chamber. A stirring device may be mounted in the decomposing chamber to break the feces for speeding up decomposition. When the waste water containing feces enters the septic tank, it is purified after separation and deposition before it is discharged via the outlet pipe.

However, each chamber of the multi-chamber type septic tank is much smaller than a septic tank having a single chamber. As a result, blocking and overflowing are apt to occur. Further, it is difficult to install the stirring device due to hinder by the partitioning walls separating the chambers.

SUMMARY OF THE INVENTION

In accordance with an aspect of the present invention, a septic tank comprises a chamber, an inlet through which waste water enters the chamber, an outlet located below the inlet, and an outlet pipe including an outlet section extending through the outlet. The outlet pipe further includes an inclined section in the chamber and extending downward from the outlet pipe. The inclined section includes a closed lower end. The inclined section further includes a suction portion located below the outlet. The suction portion includes a plurality of through-holes in a circumference thereof for sucking dischargeable purified waste water in the chamber into the inclined section and then discharged via the outlet section.

The chamber is a sealed chamber and has no partitioning wall. The outlet section of the outlet pipe includes an inner end located in the chamber, and the suction portion extends downward from the inner end of the outlet section. Preferably, the inclined section has an inclining angle in a range of 30–60 degrees, and most preferably 45 degrees. Preferably, the suction portion of the inclined section is six to eight inches below the outlet.

The septic tank may further include a stirring device for stirring sludge at a bottom of the chamber. The stirring device comprising a shaft including a lower end to which a plurality of blades are mounted for stirring the sludge.

In an embodiment of the invention, the stirring device comprises a motor for driving the shaft. In another embodiment of the invention, the stirring device comprises a hand wheel mounted to an upper end of the shaft for manual operation. In another embodiment of the invention, the stirring device includes a plurality of vanes mounted on an upper section of the shaft in the chamber. Water is supplied to impact the vanes for driving the shaft.

Thus, the purified waste water can be automatically discharged by siphon effect. The overall volume of the septic tank is not divided to avoid blocking and overflowing and to speed up decomposition and deposition. Further, a stirring device can be easily mounted in the septic tank.

The septic tank may further include a partitioning wall to define a compartment for receiving the outlet pipe. An ultraviolet lamp may be mounted in the compartment. The partitioning wall extends from a top wall to a position slightly lower than the lower end of the suction portion of the outlet pipe. The partitioning wall may include a plurality of openings through which water passes. A mesh may be mounted in the compartment and below the suction portion of the outlet pipe to prevent decomposed sludge from entering the compartment.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
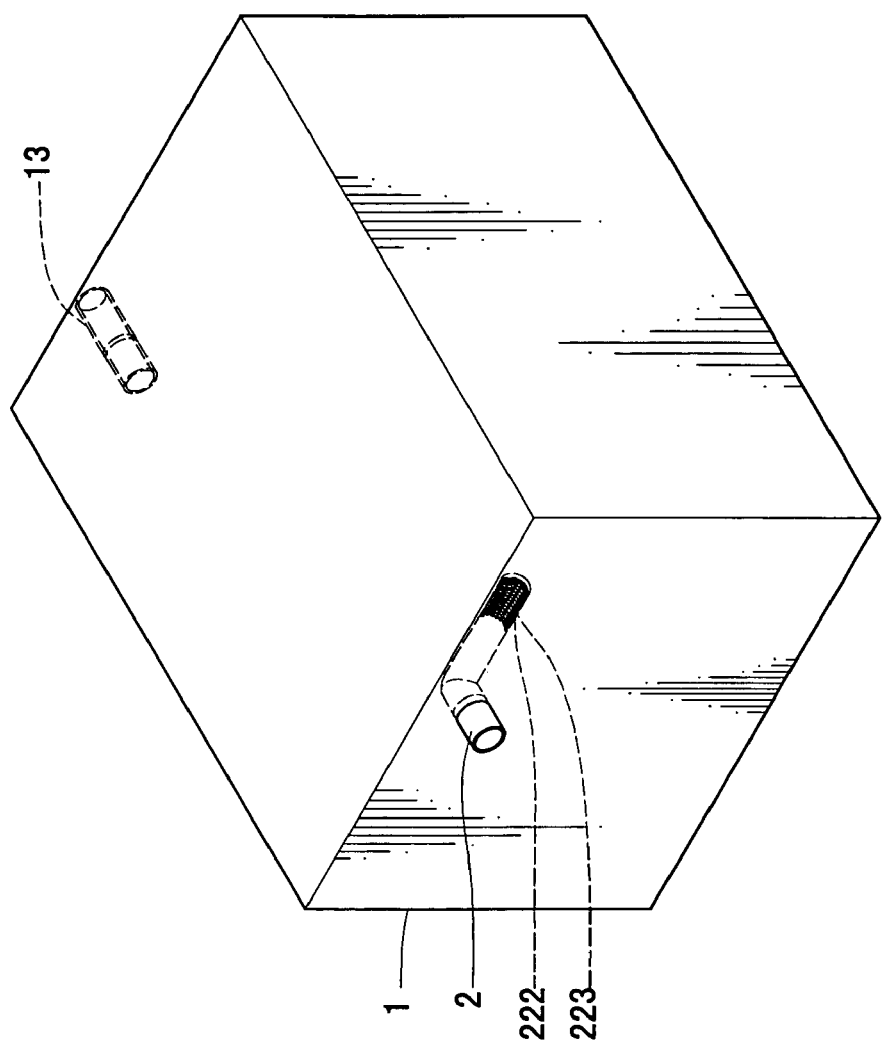
FIG. 1 is a perspective view of a septic tank in accordance with the present invention.
Figure 2:
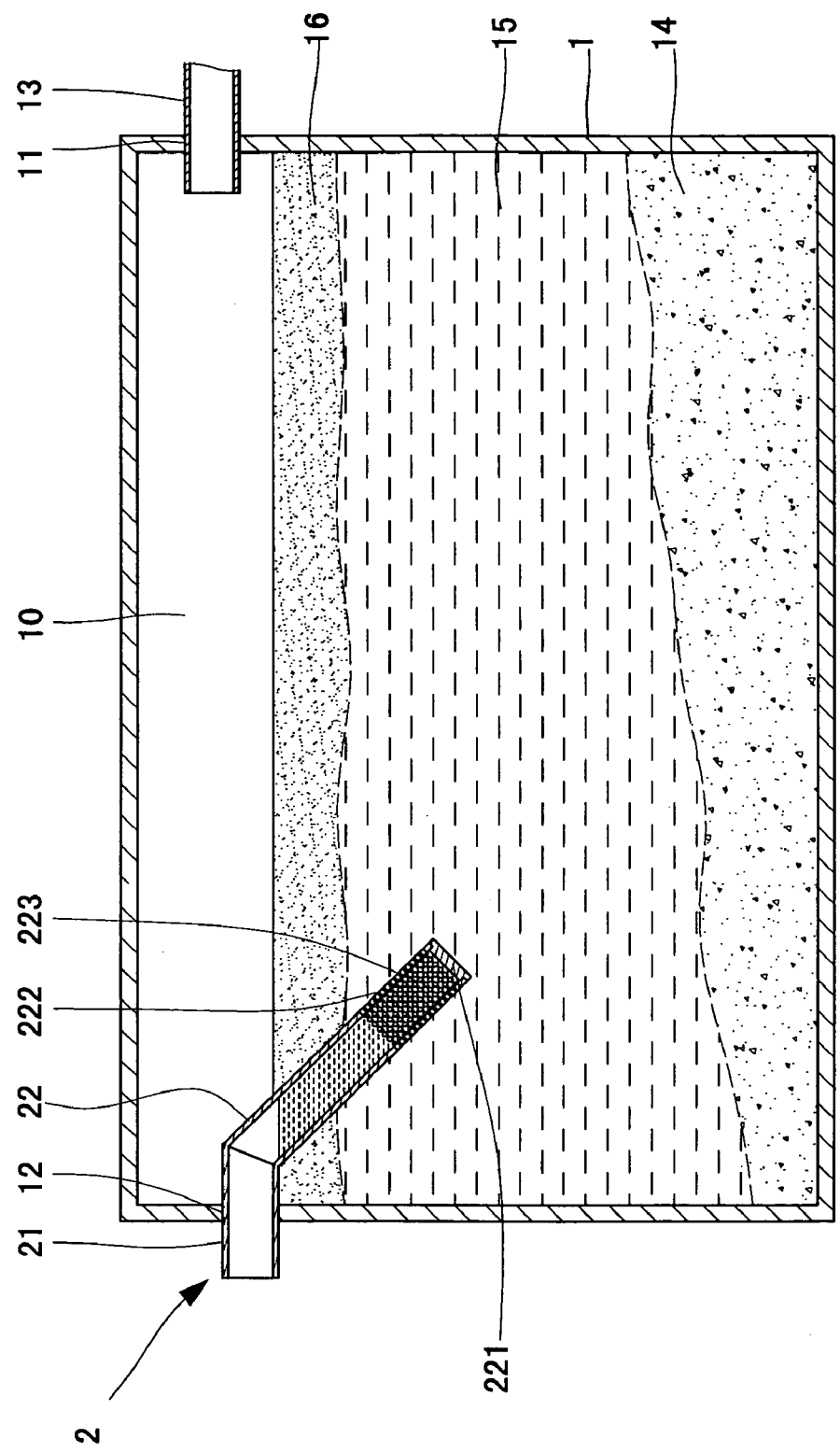
FIG. 2 is a sectional view of the septic tank in accordance with the present invention.

Referring to FIGS. 1 and 2, a septic tank 1 in accordance with the present invention comprises a chamber 10, a waste water inlet 11 to which an inlet pipe 13 is mounted, and a waste water outlet 12 to which an outlet pipe 2 is mounted. The chamber 10 has no partitioning wall therein, providing a relatively large volume for receiving waste water containing feces or the like. The outlet 12 is preferably two (2) inches lower than the inlet 11.

The outlet pipe 2 includes an upper section 21 extending through the outlet 12 and an inclined section 22 extending downward from an inner end of the upper section 21 inside the chamber 10. Preferably, the inclined section 22 has an inclining angle in a range of 30–60 degrees, and most preferably 45 degrees. The inclined section 22 has a closed lower end 221. Further, the inclined section 22 has a suction portion 222 that is preferably 6 to 8 inches below the outlet 12. The suction portion 222 has a plurality of through-holes 223 in a circumference thereof.

Referring to FIG. 2, household waste water (including waste water containing feces discharged from the toilets) enters the chamber 10 via the inlet pipe 13. Decomposed and decayed solid dirties deposits at the bottom of the chamber 10 and thus becomes sludge, forming a deposit section 14. Above the deposit section 14 is a dischargeable purified waste water section 15 that is sufficiently purified and thus dischargeable, and a suspension section 16 containing light suspensions is located above the dischargeable purified waste water section 15. The dischargeable purified waste water section 15 is about six (6) inches below the suspension section 16.

When household waste water is discharged into the chamber 10 via the inlet pipe 13, the dischargeable waste water in the dischargeable purified waste water section 15 enters the inclined section 22 of the outlet pipe 2 via the through-holes 223 in the suction portion 222. This is because the water level in the chamber 10 rises when the overall volume of the waste water (including feces) in the chamber 10 increases. The through-holes 223 in the suction portion 222 provide a siphon effect to discharge dischargeable purified waste water in the inclined section 22 of the outlet pipe 2 when the waste water level is above the outlet 12. Thus, the dischargeable waste water in the dischargeable purified waste water section 15 can be quickly discharged via the outlet pipe 2 by the siphon effect. Since the lower end 221 of the inclined section 22 is closed and since the wall delimiting the chamber 10 of the septic tank is sealed, unpurified waste water (including dirties) will not be discharged.

By this arrangement, the overall volume of the chamber 10 of the septic tank is effectively used while speeding up decomposition and deposition of the waste water.

Figure 3:
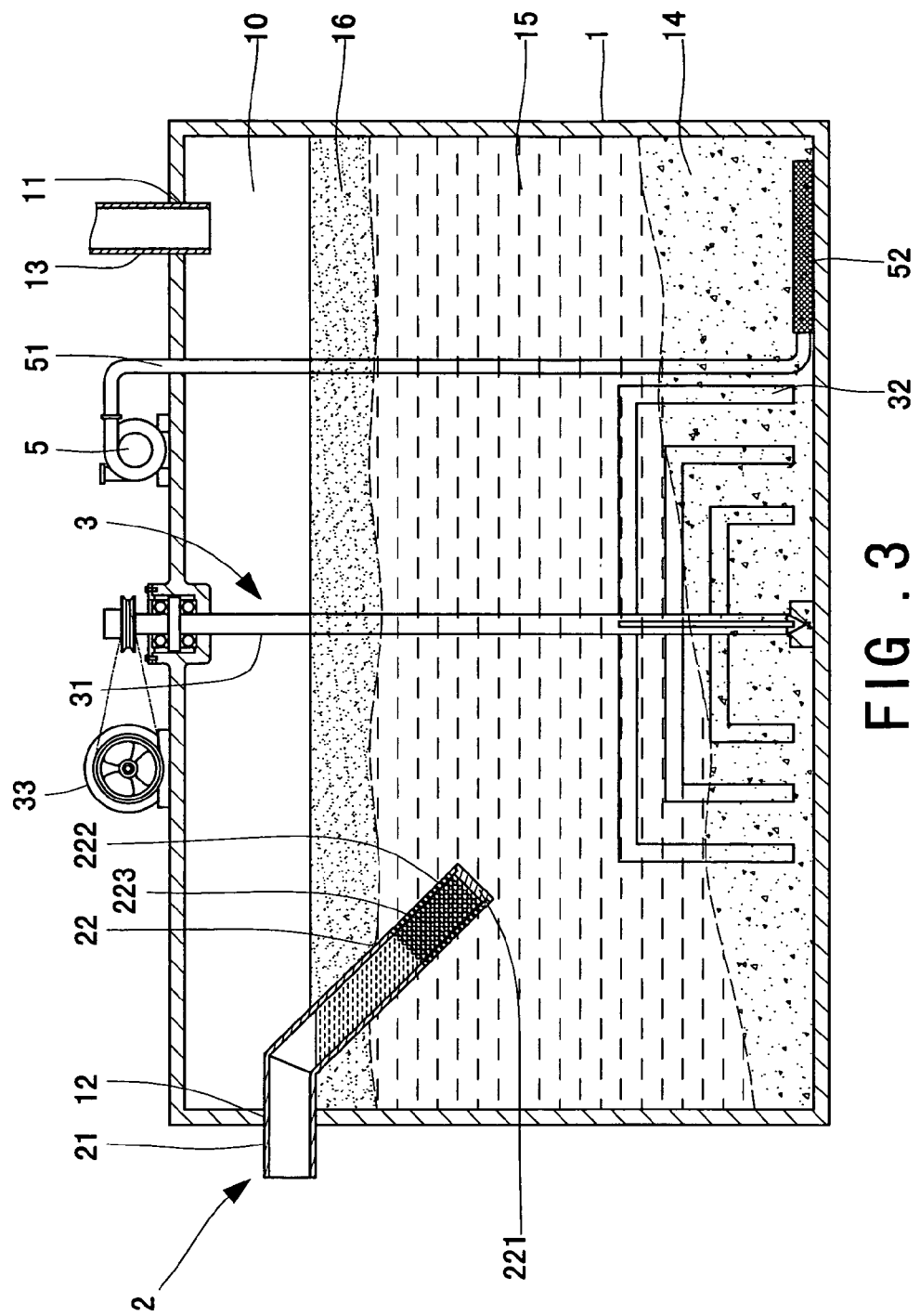
FIG. 3 is a sectional view of a modified embodiment of the septic tank in accordance with the present invention.
Figure 6:
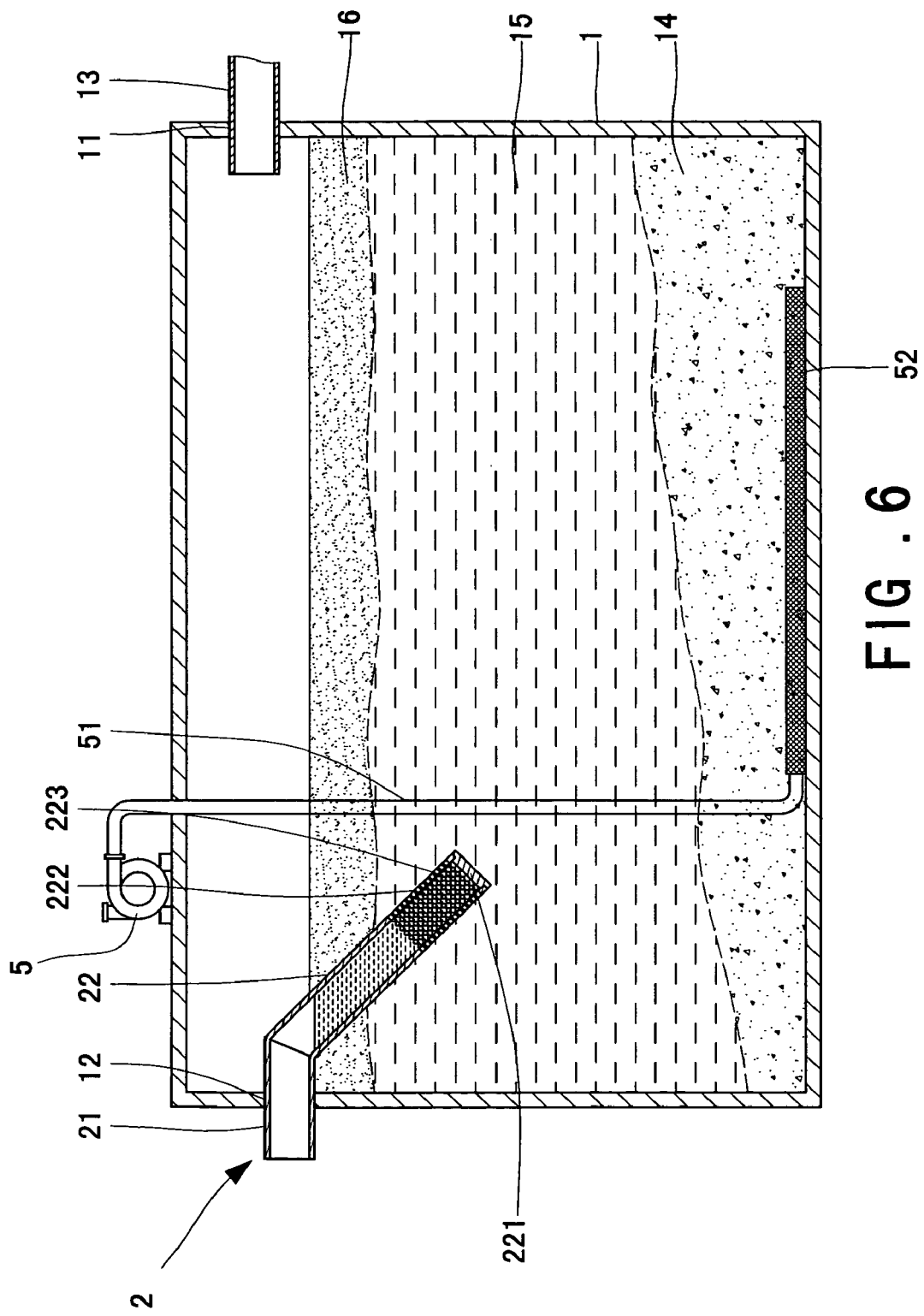
FIG. 6 is a sectional view of still another modified embodiment of the septic tank in accordance with the present invention.

Referring to FIG. 3, a stirring device 3 can be easily installed in any desired place of the chamber 10, as there is no partitioning wall in the chamber 10. The stirring device 3 includes a shaft 31 having a lower end in the chamber 10 and an upper end outside the chamber 10. A plurality of blades 32 are mounted to the lower end of the shaft 31, and a pulley (not labeled) is mounted on the upper end of the shaft 10 and driven by a motor 33 via an endless belt (not labeled). The blades 32 are turned to stir the sludge, speeding up decomposition of the sludge. Further, an air-feeding device 5 can be mounted on top of the septic tank 1 for feeding air into the bottom of the septic tank 1 via a tube 51. The tube 51 includes a porous outlet end 52 for outputting air bubbles to further speeding up decomposition of the sludge. The stirring device 3 can be omitted, as shown in FIG. 6.

Figure 4:
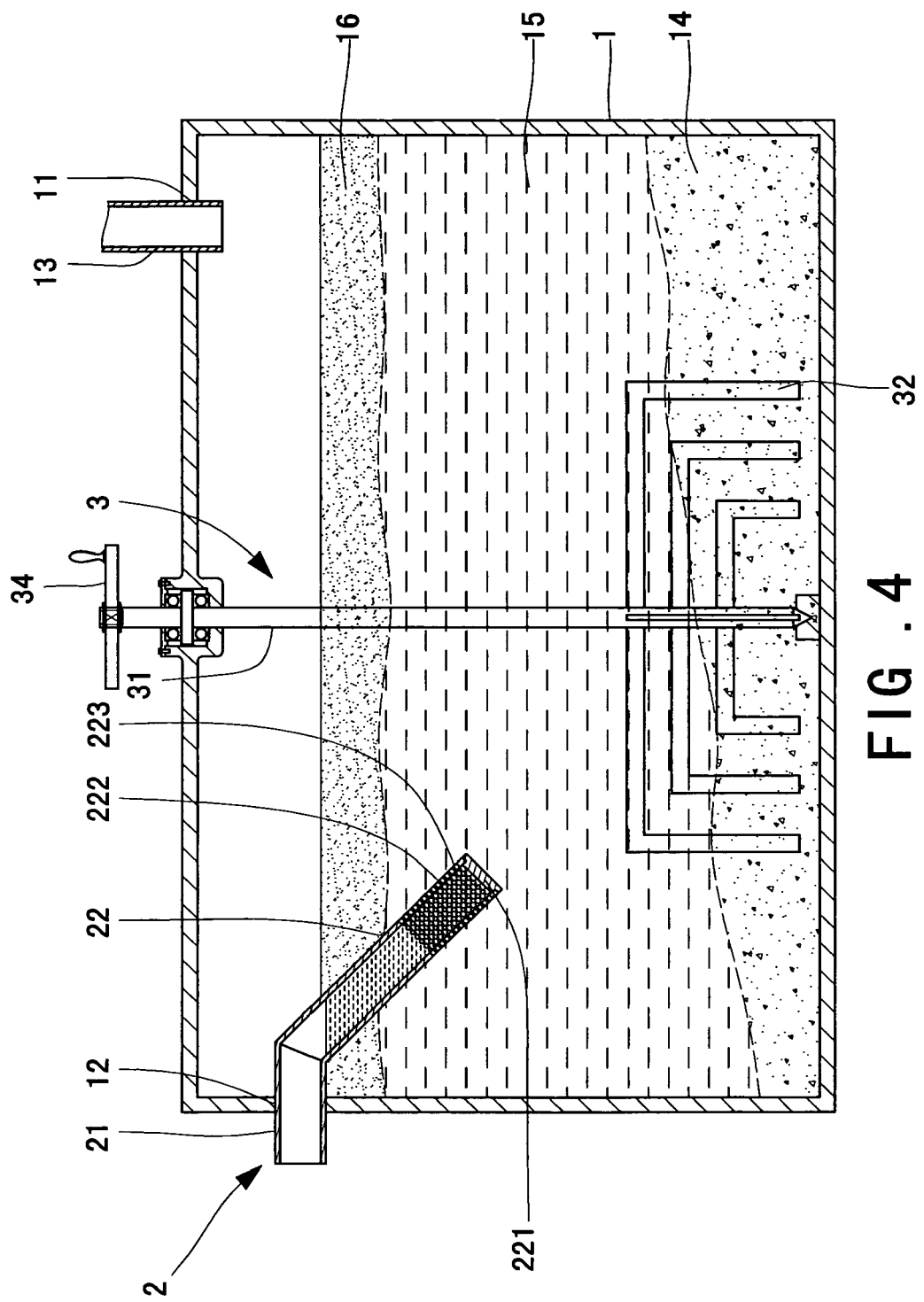
FIG. 4 is a sectional view of another modified embodiment of the septic tank in accordance with the present invention.

FIG. 4 shows another embodiment of the stirring device 3. In this embodiment, the stirring device 3 comprises a hand wheel 34 directly mounted on the upper end of the shaft 31 to allow manual operation.

Figure 5:
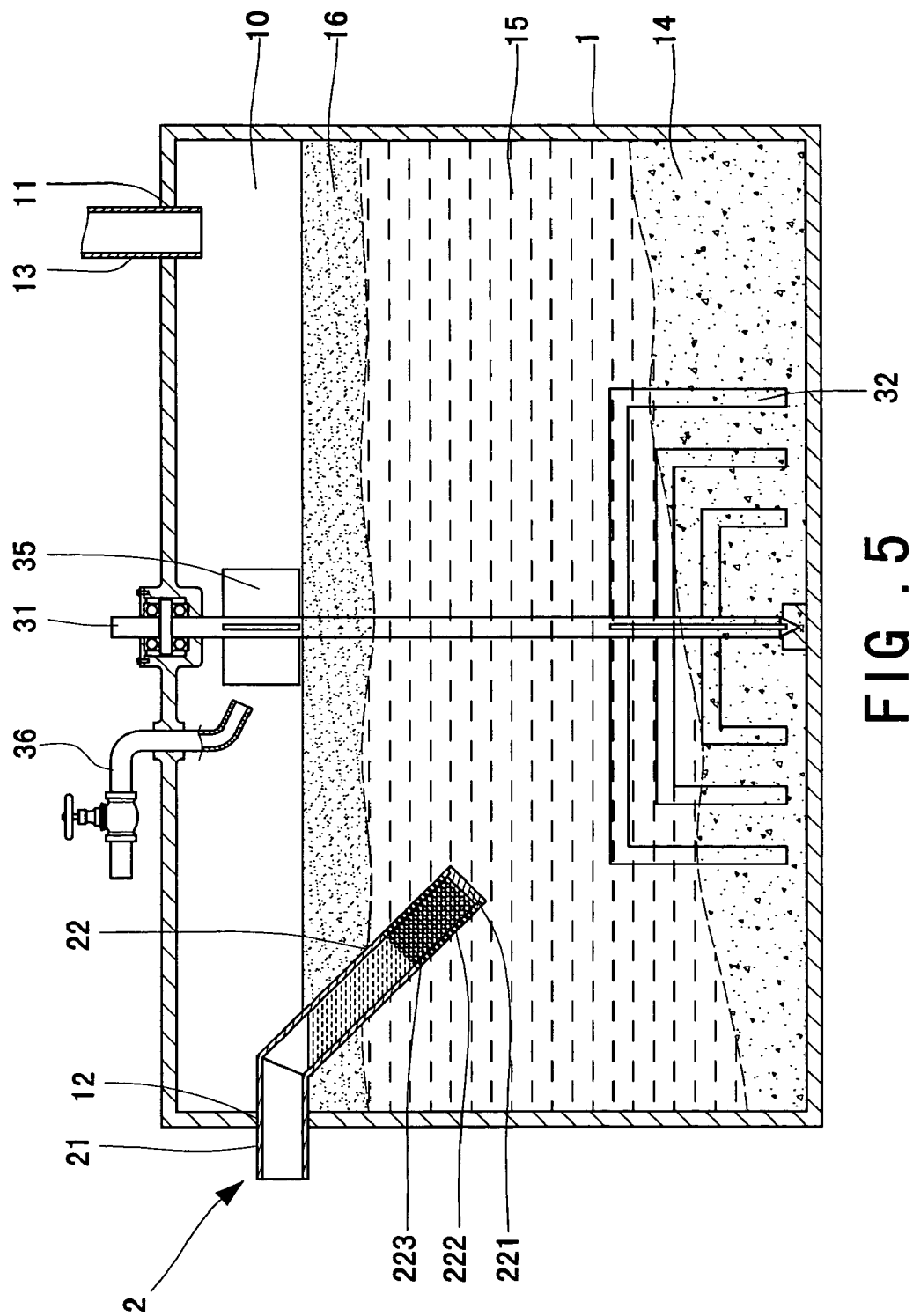
FIG. 5 is a sectional view of a further modified embodiment of the septic tank in accordance with the present invention.

FIG. 5 shows a further embodiment of the stirring device 3. In this embodiment, the stirring device 3 comprises a plurality of vanes 35 on an upper section of the shaft 31 that is located in the chamber 10. A water pipe 36 has an end extending into the chamber 10 for supplying water to impact the vanes 35, thereby driving the shaft 31 to turn.

Figure 7:
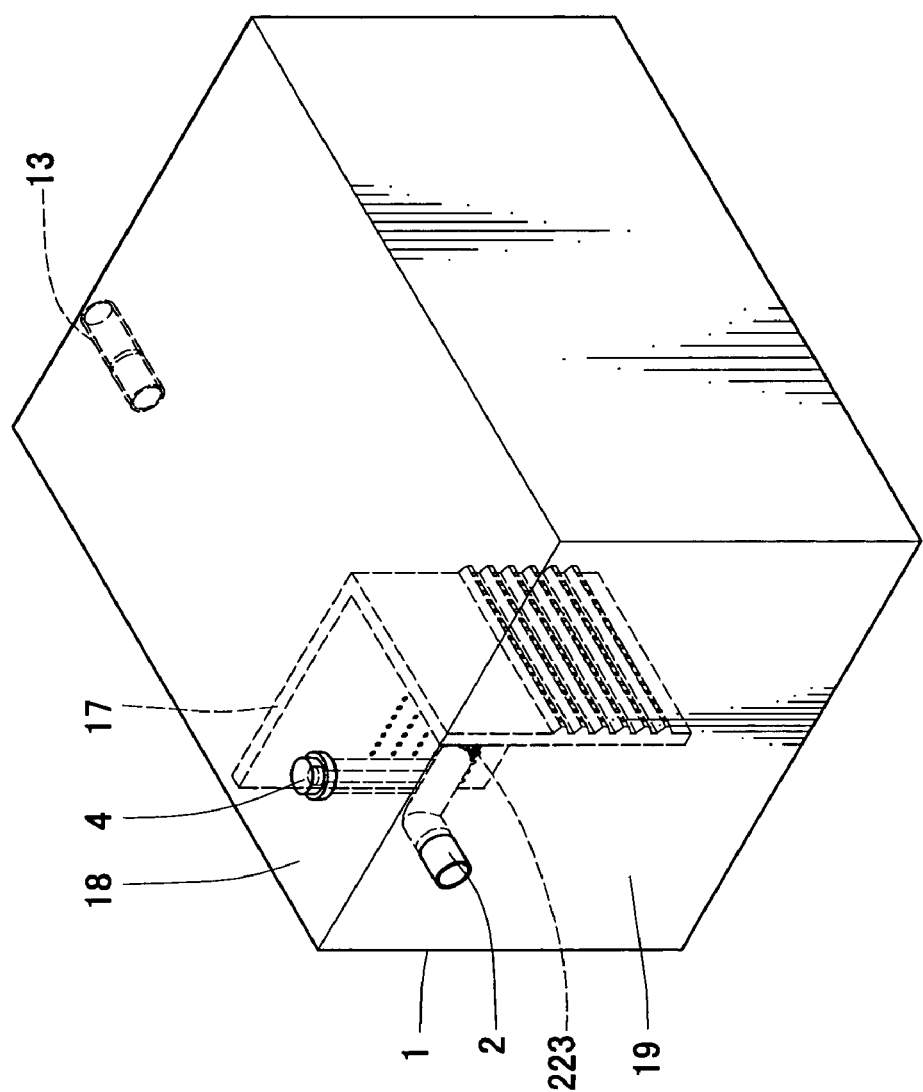
FIG. 7 is a perspective view of yet another modified embodiment of the septic tank in accordance with the present invention.
Figure 8:
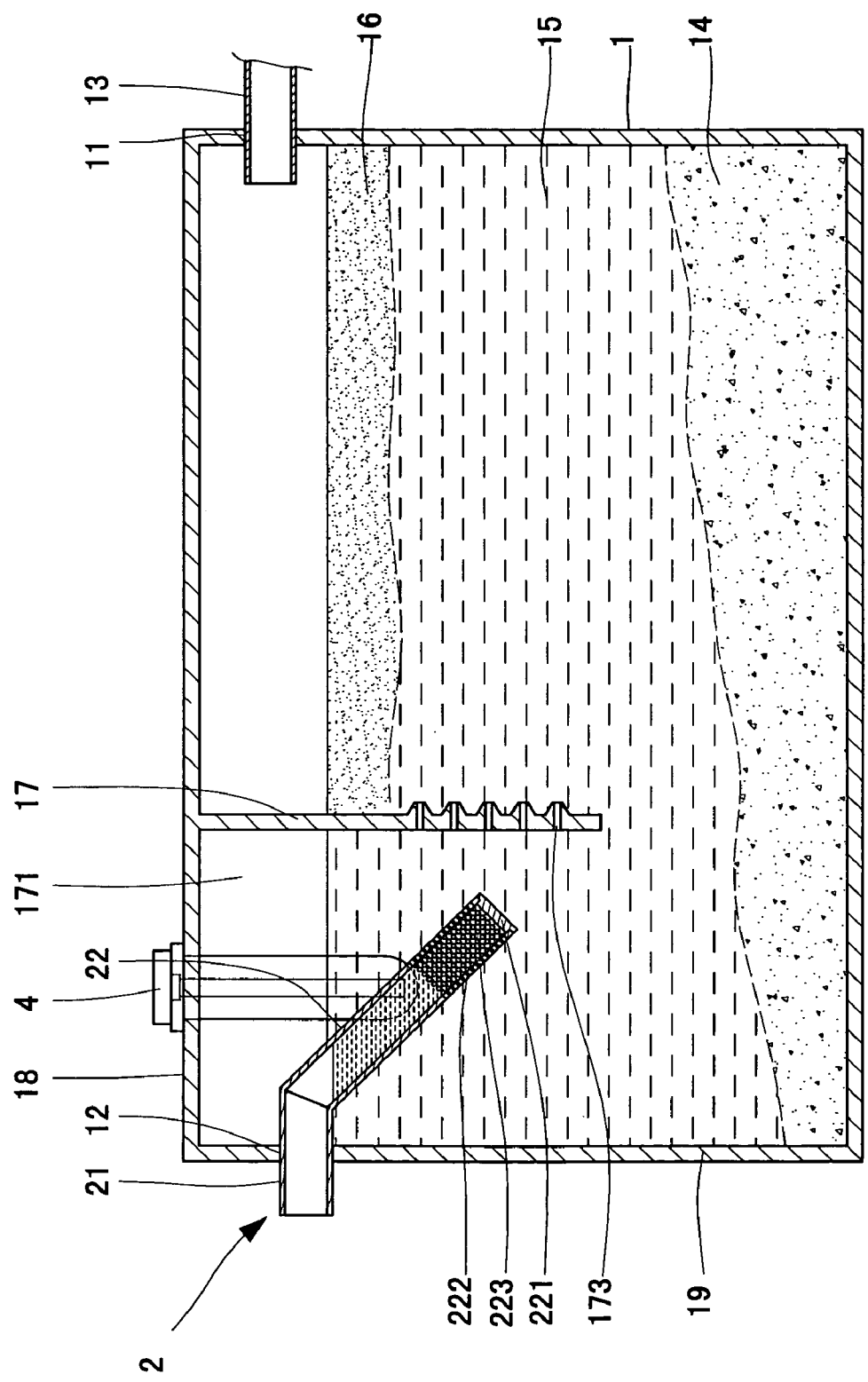
FIG. 8 is a sectional view of the septic tank in FIG. 7.

FIGS. 7 and 8 show a modified embodiment of the septic tank. In this embodiment, a substantially L-shaped partitioning wall 17 is provided in the septic tank 1 to define a compartment 171 for receiving the outlet pipe 2 between the partitioning wall 17 and two sidewalls 19 of the septic tank 1. The suspension section 16 is isolated from the compartment 171 to prevent unpurified waste water from being discharged. As illustrated in FIG. 8, the partitioning wall 17 extends downward from a ceiling or top wall of the septic tank 1 to a position slightly lower than the lower end 221 of the inclined section 22 of the outlet pipe 2. Further, the partitioning wall 171 includes a plurality of openings 173 below the suspension section 16 and preferably at a level lower than the suction portion 222. Thus, water may flow through the openings 173 into the compartment 171. Further, an ultraviolet lamp 4 is mounted in the compartment 171 for killing bacteria.

Figure 9:
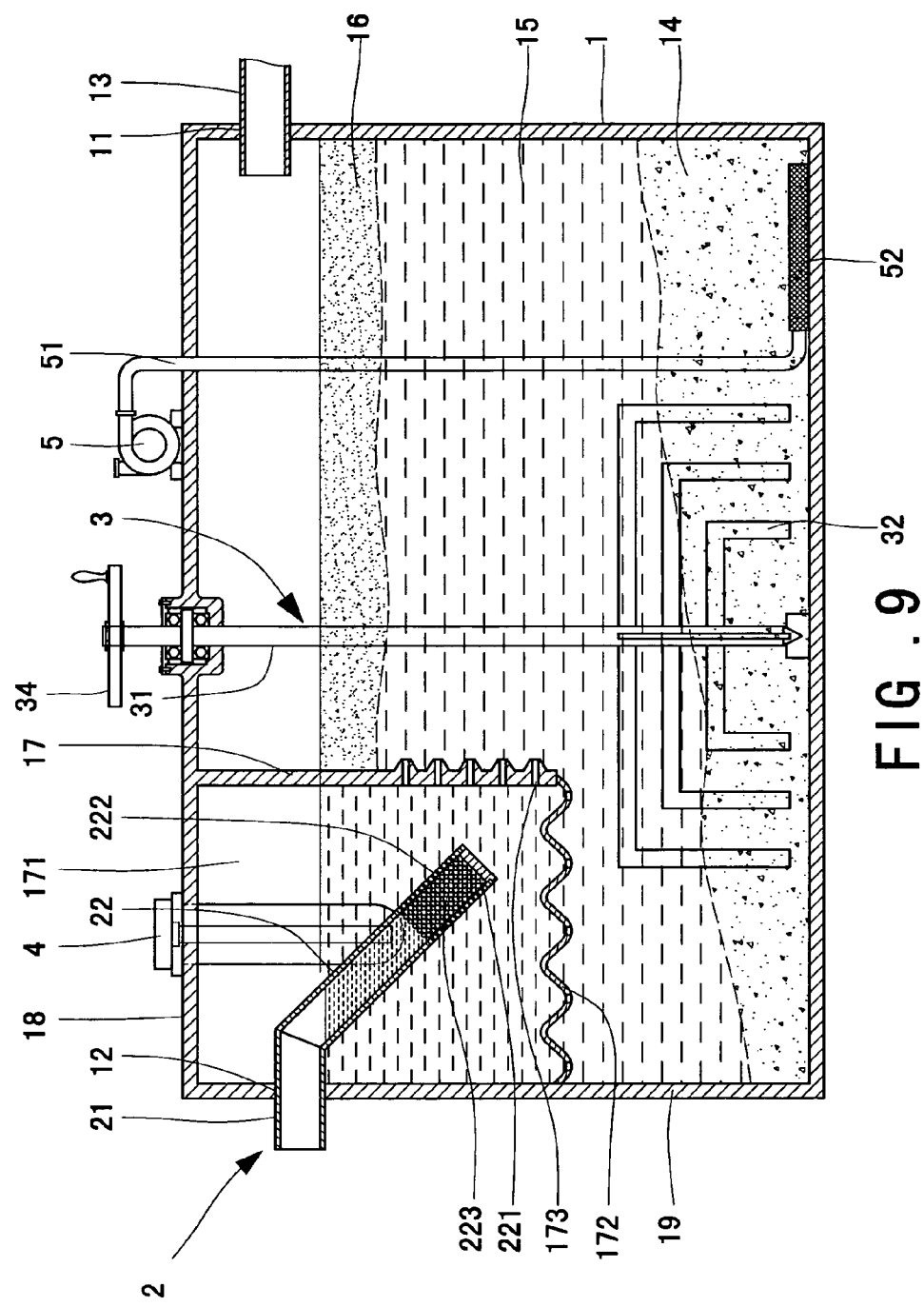
FIG. 9 is a sectional view of still another modified embodiment of the septic tank in accordance with the present invention.

The stirring device 3 and the air-feeding device 5 in FIG. 3 can be used in the embodiment of FIG. 8, as illustrated in FIG. 9. Further, a mesh 172 can be mounted between a lower end of the partitioning wall 17 and the sidewalls 19 of the septic tank 1. The mesh 172 in the compartment 171 and below the suction portion 222 of the outlet pipe 2 prevents decomposed waste from entering the compartment 171.

Although specific embodiments have been illustrated and described, numerous modifications and variations are still possible without departing from the essence of the invention. The scope of the invention is limited by the accompanying claims.

What is claimed is:

1. A septic tank comprising:
   a chamber;
   an inlet through which waste water enters the chamber;
   an outlet located below the inlet; and
   an outlet pipe including an outlet section extending through the outlet, the outlet pipe further including an inclined section in the chamber and extending downward from the outlet pipe, the inclined section including a closed lower end, the inclined section further including a suction portion located below the outlet, the suction portion including a plurality of through-holes in a circumference thereof for sucking dischargeable purified waste water in the chamber into the inclined section and then discharged via the outlet section.

2. The septic tank as claimed in claim 1, with the chamber being a sealed chamber and having no partitioning wall.

3. The septic tank as claimed in claim 1, with the outlet section of the outlet pipe including an inner end located in the chamber, and with the suction portion extending downward from the inner end of the outlet section.

4. The septic tank as claimed in claim 1, with the inclined section having an inclining angle in a range of 30–60 degrees.

5. The septic tank as claimed in claim 1, with the inclined section having an inclining angle of 45 degrees.

6. The septic tank as claimed in claim 1, with the suction portion of the inclined section being six to eight inches below the outlet.

7. The septic tank as claimed in claim 1, with the septic tank further including a stirring device for stirring sludge at a bottom of the chamber.

8. The septic tank as claimed in claim 7, with the stirring device comprising a shaft including a lower end, with a plurality of blades being mounted to the lower end of the shaft for stirring the sludge.

9. The septic tank as claimed in claim 8, with the stirring device comprising a motor for driving the shaft.

10. The septic tank as claimed in claim 8, with the stirring device comprising a hand wheel mounted to an upper end of the shaft.

11. The septic tank as claimed in claim 8, with the stirring device including a plurality of vanes mounted on an upper section of the shaft in the chamber, with the stirring device comprising means for supplying water to impact the vanes to thereby turn the shaft.

12. The septic tank as claimed in claim 1, with the septic tank further including an air-feeding device for feeding air to a bottom of the chamber.

13. The septic tank as claimed in claim 1, with the septic tank further including a partitioning wall to define a compartment for receiving the outlet pipe.

14. The septic tank as claimed in claim 13, with the septic tank further including an ultraviolet lamp mounted in the compartment.

15. The septic tank as claimed in claim 13, with the partitioning wall extending from a top wall to a position slightly lower than the lower end of the suction portion of the outlet pipe.

16. The septic tank as claimed in claim 13, with the partitioning wall including a plurality of openings.

17. The septic tank as claimed in claim 13, with the septic tank further including a mesh mounted in the compartment and below the suction portion of the outlet pipe.

* * * * *